United States Patent [19]

Nabeshima

[11] 4,439,849

[45] Mar. 27, 1984

[54] ROTATIONAL SPEED CONTROLLING APPARATUS FOR RECORDING DISC

[75] Inventor: Daiki Nabeshima, Kamakura, Japan

[73] Assignee: Tokyo Shibaura Denki Kabushiki Kaisha, Kanagawa, Japan

[21] Appl. No.: 298,914

[22] Filed: Sep. 2, 1981

[30] Foreign Application Priority Data

Sep. 30, 1980 [JP] Japan .................................. 55-136559

[51] Int. Cl.³ ............................................. G11B 19/24
[52] U.S. Cl. ..................................... 369/50; 369/111; 369/240; 358/338; 358/339
[58] Field of Search ....................... 369/47, 48, 50, 51, 369/111, 189, 240; 358/322, 338, 342, 339, 321; 360/73

[56] References Cited

U.S. PATENT DOCUMENTS

| | | | |
|---|---|---|---|
| 3,939,302 | 2/1976 | Kihara | 369/48 |
| 4,223,349 | 9/1980 | Dakin et al. | 369/50 |
| 4,338,683 | 7/1982 | Furukawa et al. | 369/50 |
| 4,353,089 | 10/1982 | Winslow et al. | 358/337 |

Primary Examiner—John H. Wolff
Assistant Examiner—Donald McElheny, Jr.
Attorney, Agent, or Firm—Cushman, Darby & Cushman

[57] ABSTRACT

An apparatus for controlling the rotational speed of a recording disc to a constant linear velocity. The apparatus has frequency and phase control circuits which detect the variations of the frequency and phase of the digital information signal reproduced from the disc, to detect the rotation speed of the disc. The rotation of the disc is controlled in response to the control signals from the frequency and phase control circuit to a constant linear velocity.

13 Claims, 6 Drawing Figures

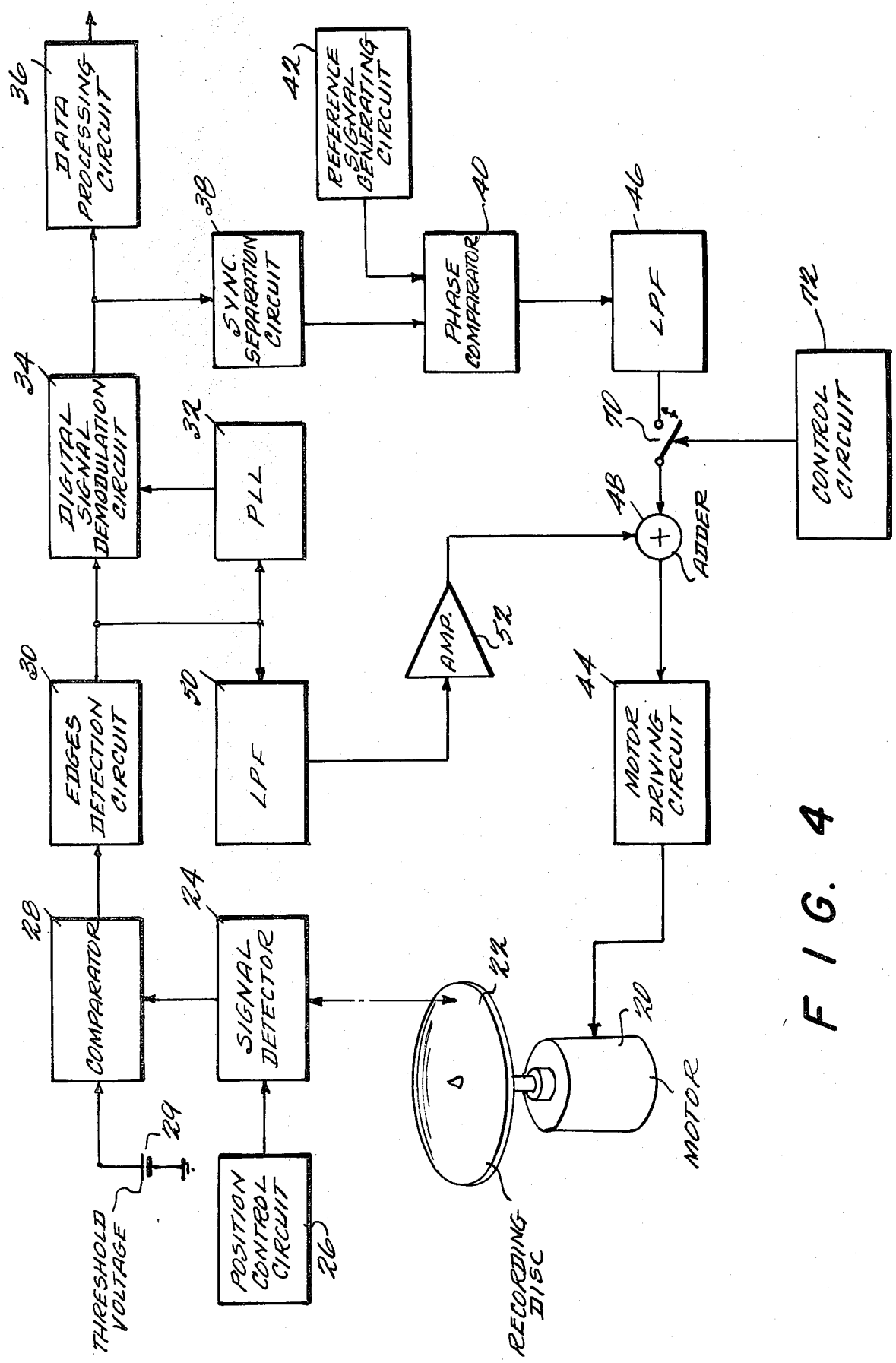
F I G. 4

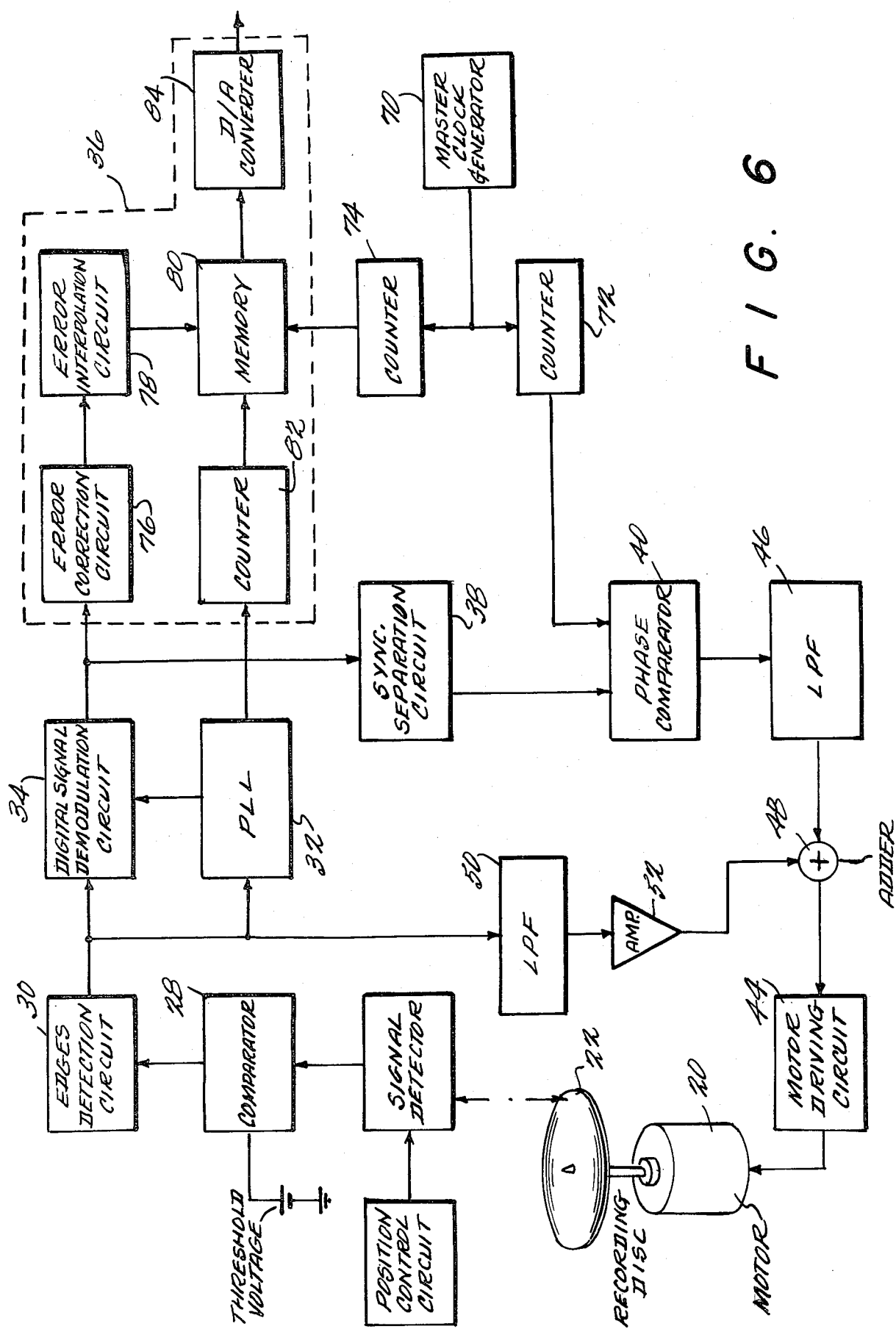

ROTATIONAL SPEED CONTROLLING APPARATUS FOR RECORDING DISC

BACKGROUND OF THE INVENTION

This invention relates to apparatus for controlling the rotational speed of a recording disc, and more particularly to apparatus of the type which controls the rotational speed of the recording disc to a constant linear velocity at any signal pick-up point on the recording disc.

PCM (Pulse Code Modulation) signal recording and reproducing systems have been intensively developed recently. This kind of system is used to convert analogue information such as an audio signal into digital information by PCM and then record it on a disc forming "pits" consisting a spiral track of the disc. The recorded information is reproduced by, for example, irradiating a convergent light beam such as a laser beam to the track of the disc and detecting the variation of the returned beam therefrom.

There are known two types of systems for controlling the rotational speed of the disc. One is a constant rotational speed system which rotates the disc at an uniform speed, and the other is a constant linear velocity system which causes the linear velocity of the disc to be constant at any signal pick-up point on the disc. The constant rotational speed system is suitable for use in recording and reproducing a signal having periodicity such as a video signal because of possibility of special reproducing operation such as stillness, slow motion and quick motion.

The constant linear velocity system is more suitable for use in recording and reproducing an audio signal which does not need the above-mentioned special reproducing operation because the signal is recorded with uniform density at any track on the disc and a large capacity of signal may be recorded.

Japanese Patent Disclosure No. 10707/79 describes a rotational speed controlling apparatus embodying a constant linear velocity system. This prior art is provided with a potentiometer. The potentiometer detects the position of the signal pick-up head on the disc and produces the voltage signal $V_R$ in proportion to the distance from the center of the disc. The rotational speed of the disc is controlled in response to the voltage signal $V_R$. This prior art, however, fails to rotate the disc with an accurately constant linear velocity, because the accuracy of detecting the position of the head depends on the accuracy of the potentiometer.

SUMMARY OF THE INVENTION

It is an object of the invention to provide apparatus for controlling the rotational speed of a recording disc to an accurately constant linear velocity.

It is another object of this invention to provide apparatus which can detect the signal pick-up point accurately and stably without regard to the inner or outer periphery on the disc.

In accordance with the referred embodiment of this invention, a digital information signal pre-recorded on the disc is reproduced. A synchronizing signal included in the information signal is extracted from the reproduced information signal and compared with a reference signal to obtain a phase difference signal. A detection circuit, which detects the inversion point of the polarity of the reproduced signal and produces a signal, is provided. The signal from the detection circuit is smoothed.

A motor driving circuit controls the rotational speed of the disc to a constant linear velocity in response to an added signal of the phase difference signal and the smoothed signal.

BRIEF DESCRIPTION OF THE DRAWINGS

These and other objects and advantages of this invention will become more apparent and more readily appreciated from the following detailed description of the presently preferred examplary embodiments of the invention taken in conjunction will the accompanying drawings, in which:

FIGS. 4 and 5 are modifications of the revolution speed controlling apparatus shown in FIG. 1; and FIG. 6 is another embodiment of the revolution speed controlling apparatus according to the present invention.

DETAILED DESCRIPTION OF THE PREFERRED EMBODIMENTS

Figure 1:
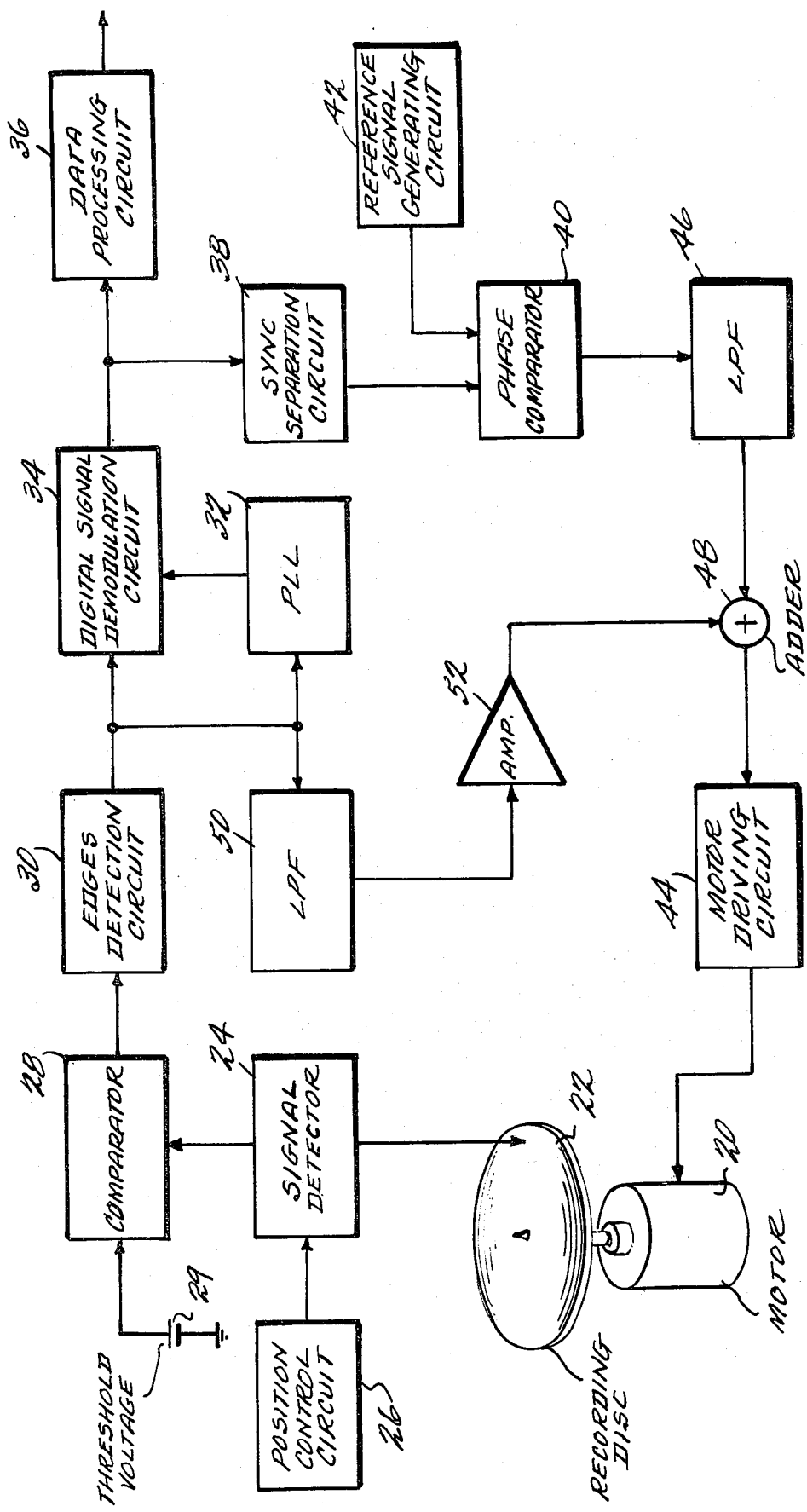
FIG. 1 schematically illustrates one embodiment of a revolution speed controlling apparatus for a recording disc according to the present invention.

Referring to FIG. 1, one embodiment of the present invention includes a motor 20 for rotating a recording disc 22 on which PCM signal information presenting, for example, an audio signal, has been pre-recorded in spiral tracks.

The pre-recorded information is read out by a signal detector 24. Signal detector 24 includes, for example, a light source such as a laser, for generating a read beam, an optical guide for guiding the read beam from the light source to disc 22, and a photodetector such as a photodiode for detecting the light beam reflected from disc 22. A position control circuit 26 is connected to signal detector 24 to move the read beam in the radial direction of disc 22.

An output signal of signal detector 24 is delivered to a comparator 28 to shape its wave form. Comparator 28 detects whether or not the voltage level of the output from signal detector 24 is higher than a predetermined threshold voltage level 29 and generates a fixed amplitude pulse each time the threshold level is exceeded.

The output signal of comparator 28 is coupled to a pulse edges detection circuit 30. Pulse edges detection circuit 30 detects the inversion point of the polarity, i.e., leading and trailing edges of the output pulse signal from comparator 28 so as to obtain a clock pulse signal component from the read-out information. The clock signal component corresponds to a basic signal used to modulate the information.

An output of pulse edges detection circuit 30 is delivered to a phase locked loop (PLL) circuit 32. PLL circuit 32 produces an output signal that is phase locked to the pulse signal from pulse edges detection circuit 30 so as to eliminate any jitter and to fill in any missing pulses.

The output pulse signal of PLL circuit 32 is delivered to a digital signal demodulation circuit 34 together with the output signal from edges detection circuit 30. Digital signal demodulation circuit 34 demodulates the signal from edges detection circuit 30 upon the output pulse signal from PLL circuit 32.

The output signal of digital demodulation circuit 34 is delivered to a data processing circuit 36. Data processing circuit 36, which includes an error correction circuit, an error interpolation circuit, a digital-to-analogue converter and other conventional circuits, processes the signal from digital signal demodulation circuit 34 to obtain an analogue audio signal defined by digital information pre-recorded on recording disc 22.

Meanwhile, the output signal of digital signal demodulation circuit 34 is delivered to a sync separation circuit 38. PCM signal information includes a synchronizing signal with a constant period. Sync separation circuit 38 separates and extracts the synchronizing signal from the output signal for digital signal demodulation circuit 34.

The output signal of sync separation circuit 38 is delivered to a phase comparator 40 together with a reference signal from a reference signal generating circuit 42. The reference signal, which is a constant period signal, has a predetermined phase relationship to the synchronizing signal separated from the PCM signal information which is reproduced while disc 22 rotates with a constant linear velocity. Phase detector 40 detects the phase difference between the output signal from sync separation circuit 38 and the reference signal, and transmits the phase difference signal to a motor driving circuit 44 through a low-pass filter 46 and an adder circuit 48.

Motor driving circuit 44 controls the rotational speed of motor 20 such that the phase difference between the synchronizing signal and the reference signal is always uniform. As a result the disc is rotated with constant linear velocity.

However, the structure mentioned above still has the following problem. The rotational speed of disc 22 varys generally several times between when the signal pick-up point is on the outer most peripheral track and when it is on the inner most peripheral track. PLL circuit 32 cannot lock the phase when the revolution speed of disc varys broadly. As a result, the syncronizing signal is not extracted, and the apparatus cannot control the rotational speed of the disc.

Accordingly, the PLL circuit should have a small time constant and a large direct current gain so as to have a wide follow-up response range.

However, on the other side, PLL circuit 32 should have a large time constant so as to respond to the edge detection signal which is not always a pulse train with a constant period, that is, misses some pulses. These requirements are in opposition. Therefore, it is difficult to construct PLL circuit 32 capable of reproducing the clock signals stably, and constant linear velocity control can not be always carried out accurately.

In accordance with the present invention, referring to FIG. 1, a low-pass filter 50 is further provided. The edge detection signal from pulse edges detection circuit 30 is delivered to low-pass filter 50. Low-pass filter 50 smoothes the edge detection signal, which is a pulse train having uniform amplitude and pulse width, to obtain a D.C. voltage signal. The output signal of low-pass filter 50 is delivered to adder circuit 48 through an amplifier 52, and added to the phase difference signal from low-pass filter 46. Accordingly, motor driving circuit 44 controls the rotational speed of motor 20. In others words the rotational speed of disc 22 is in response to the output signal from adder circuit 48.

If the peak voltage of the output pulse signal of pulse edges detection circuit 30 is denoted by E, its pulse width by $\Delta T$ and the number of pulses per unit time by N, the smoothed voltage signal is expressed by $E\Delta T N$. In general the number of pulses N is not constant because it depends on the nature of signal and the modulation system, such as MFM (Modified Frequency Modulation), NRZI (Non Return to Zero Inverter) and the like. However, audio signals and sound signals converted into digital signals have statistically the characteristic that the number of pulses per unit time is approximately constant. Accordingly, when disc 22 is rotated with a constant linear velocity, the number of pulses N is approximately constant in the specific modulation system, and also the smoothed signal voltage is constant when disc 22 is rotate.

When the number of pulses N varys, the smoothed signal voltage varys. Motor driving circuit 44 controls the rotational speed of motor 20 roughly in response to the smoothed signal voltage such that the smoothed signal voltage is kept at a predetermined value.

When disc 20 rotates with the rotational spped within a predetermined range of linear velocity under the above-mentioned control, PLL circuit 32 operates and produces the clock pulse signal component. Therefore, digital signal demodulation circuit 34, sync/separation circuit 38 and phase comparator 40 operate, the phase difference signal is produced from phase comparator 40 and delivered to motor driving circuit 44 through low-pass filter 46 and adder circuit 48. Motor driving circuit 44 then adjusts the rotational speed of motor 20 to an accurately constant linear velocity in response to the phase difference signal.

As described above, the rotational speed controlling apparatus according to the present invention has a frequency control loop and phase control loop. The frequency control loop smoothes the pulses produced at the edges of the information signal and controls the rotational speed of the motor to the constant linear velocity.

The phase control loop detects the difference of phases between the synchronizing signal and the reference signal, and controls the rotational speed of the motor to a constant linear velocity. Accordingly, the disc can be rotated very accurately and stably with a constant velocity, and as a result, wow and flutter of the reproducing signal is reduced. Further, high quality reproduction is obtained because of the stable operation of the PLL circuit.

Figure 2:
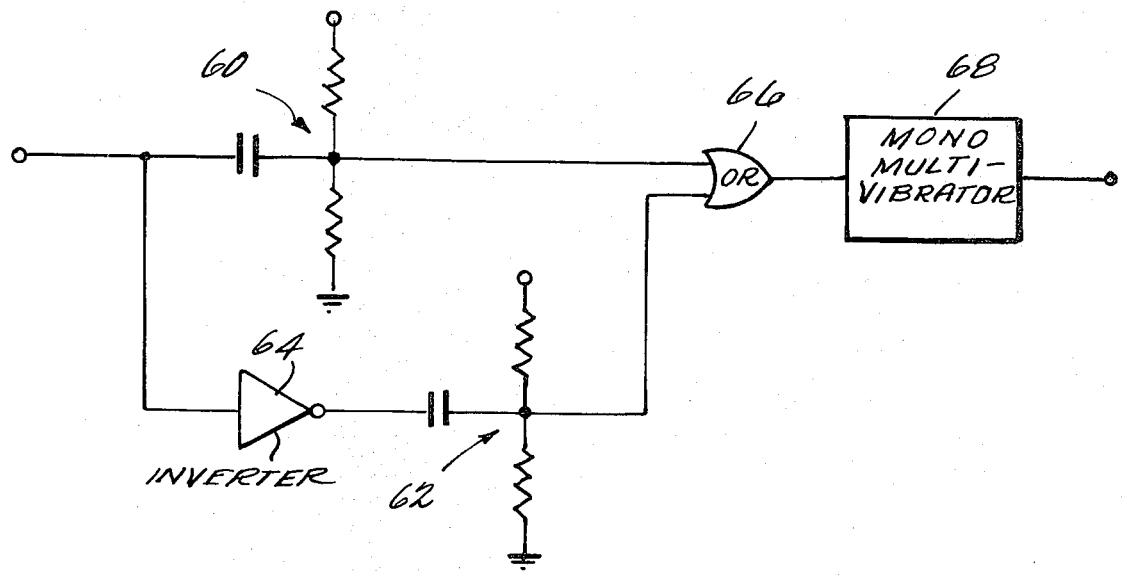
FIG. 2 shows an exemplary circuit of the pulse edges detection circuit in FIG. 1.

FIG. 2 shows an exemplary circuit of the pulse edges detection circuit shown in FIG. 1. The pulse edges detection circuit includes first and second differentitating circuits 60 and 62. An input pulse signal, that is, the output signal from comparator 28 shown in FIG. 1, is supplied to first differentiating circuit 60 and also supplied to second differentiating circuit 62 through a inverting circuit 64. First and second differentiating circuits 60 and 62 each differentiate the input signal and generate differential pulse signals in response to the edges of the input pulse signal. The differential pulse signals from first and second differentiating circuits 60 and 62 are delivered to an OR gate 66. As a result, pulse signals responding to leading and trailing edges of the input pulse are produced from OR gate 66. The output signal of OR gate 66 is delivered to a monostable multivibrator 68. Monostable multivibrator 68 is triggered by the output signal from OR gate 66 and generates an edge detection signal having uniform amplitude and pulse width.

Figure 3:
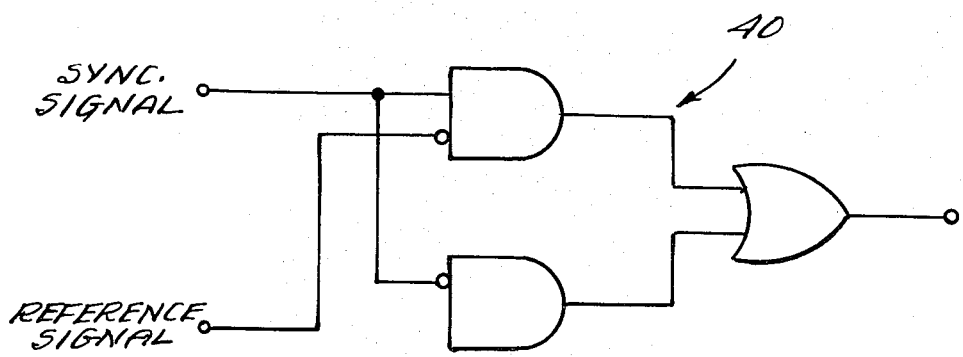
FIG. 3 shows a exemplary circuit of the phase comparator in FIG. 1.

Referring back to FIG. 1, as mentioned above the synchronizing signal is not supplied to phase comparator when PLL circuit does not operate. However, it is desirable for controlling the rotation speed of motor 20 that the D.C. level of the output signal of phase comparator 40 does not vary broadly between when the synchronizing signal is supplied from sync separation circuit 38 and when it is not supplied. Accordingly, phase comparator 40 preferably includes an EX-OR (exclusive-OR) circuit as shown in FIG. 3. This EX-OR circuit is designed so that the duty ratios of the synchronizing signal and the reference signal each are 50 percent and the phase between the synchronizing signal and the reference signal is delayed by 90 degrees. Thus, the D.C. level of the output signal of phase comparator 40 does not change even if phase comparator 40 does not receive the synchronizing signal.

There is a possibility of interference between the frequency control loop and the phase control loop. However, this interference is effectively reduced by the manner in which the time constant of the frequency control is larger than that of the phase control loop.

FIG. 4 shows a modification of the rotational speed controlling apparatus shown in FIG. 1. In FIG. 4, like reference characters designate similar parts to that of FIG. 1. A switching circuit 70 is provided between low-pass filter 46 and adder circuit 48. A switching control signal is suplied to switching circuit 70 from a control circuit 72. Switching circuit 70 switches in response to the switching control signal so as to pass the signal from low-pass filter 46 to adder circuit 48 selectively.

When the control with a high accuracy is not required, for example, when the recorded information is searched at a high speed, the switching circuit 70 switches "OFF" in response to the switching control signal. Accordingly, the revolution speed of motor 20 is controlled in response to only the smoothed voltage signal from low-pass filter 50.

Figure 5:
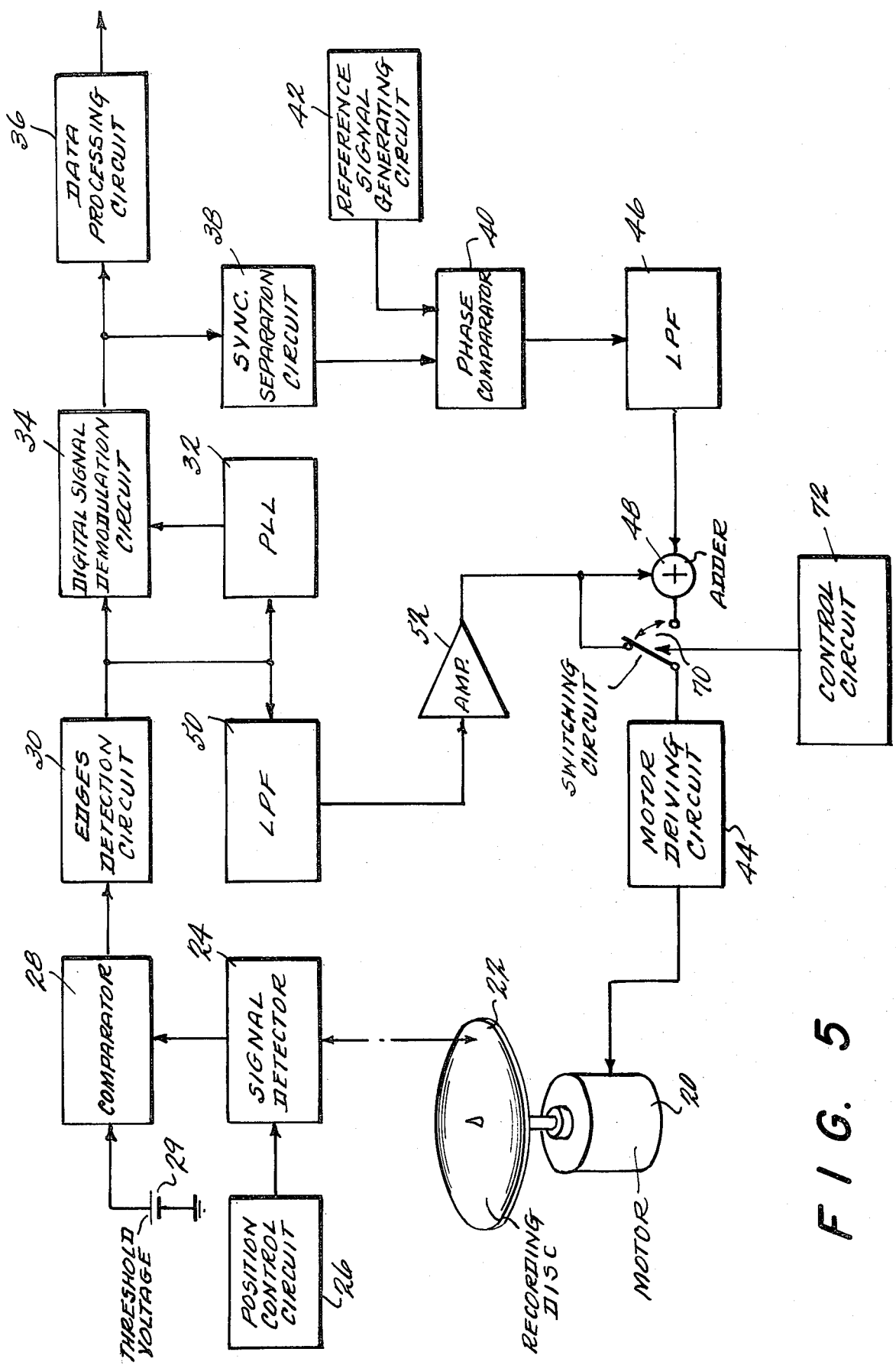

Also switching circuit 70 may be provided between adder circuit 48 and motor driving circuit 44 as shown in FIG. 5. Switching circuit 70 cause either the output signal from adder circuit 48 or the output signal from amplifier 52 to pass to motor driving circuit 44 selectively in response to the switching control signal from control circuit 72.

FIG. 6 shows another embodiment of the rotational speed controlling apparatus according to the present invention. In FIG. 6, like reference characters designate similar parts to that of FIG. 1. This embodiment is provided with a master clock generator 70 for generating a master clock signal. The master clock signal generated by master clock generator 70 is counted down by counters 72 and 74. The output signal of counter 72 is delivered to phase comparator 40 as the reference signal. The output signal of counter 74 is delivered to data processing circuit 36.

Data processing circuit 36 includes an error correction circuit 76 and an error interpolation circuit 78. Error correction circuit 76 corrects errors in the signal from digital signal demodulation circuit 34. Error interpolation circuit 78 interpolates errors which can not be corrected by error correction circuit 76. The demodulated signal thus corrected or interpolated is delivered to a memory circuit 80. Memory circuit 80 stores the demodulated signal in response to a signal from a counter 82 which counts down the output signal from PLL circuit 32 and reads it out in response to the signal from counter 74. The read-out signal from memory circuit 80 is delivered to a digital-to-analogue converter 84 to convert into the original analogue signal.

In general, PCM signal information to be recorded includes a synchronizing signal, error detection and correction signal, etc. as well as a pure information signal. If one data block has M words of the pure digital information and K words of the above-mentioned signal except the pure information, and further a sampling signal frequency in recording is denoted by f(s), the transmission frequency per unit word in recording and reproducing is expressed by $(M+K/M)$ f(s). However, the digital information must be finally restored into the original information by converting with the original sampling signal frequency f(s).

Accordingly, the demodulated signal is stored in memory circuit 80 in response to the writing control signal having the frequency $(M+K/M)$ f(s) from counter 82, and read out in response to the read-out control singal having the frequency f(s) from counter 72. The read-out control signal having the frequency f(s) may be also obtained by counting down the output signal of PLL circuit 32. However, the frequency of the output signal of PLL circuit 32 is not stable. Therefore, if the read-out control signal obtained by counting down the output signal of PLL circuit 32 is used, the output signal processed by data processing circuit 36 includes a great deal of wow and flutter.

While, in this embodiment, the read-out clock signal having the frequency of f(s) is supplied from master clock generator 70 through counter 74. Since the master clock is very stable, the output signal from data processing circuit 36 has a high quality.

The frequency of the signal generated by master clock generator 70 is preferably integral multiples of both frequencies of the read-out signal f(s) and the syncronizing signal.

As described above, the revolution speed controlling apparatus according to this invention can stably control the revolution speed of the disc to be an accurately constant linear velocity.

As an alternative to the embodiments shown in FIG. 1, the reproducing system using a light beam may be replaced by another reproducing system, for example, a system which reproduces the variation of electrostatic capacity between the disc and the scanning electrode. Further, digital signal demodulation circuit 34 may demodulate the output signal from comparator 38 instead of the output signal from edges detection circuit 30.

While the present invention has been described in connection with what is presently considered to be the most practical and preferred embodiments, it is to be understood that the present invention is not to be limited to the disclosed embodiments but on the contrary, is intended to cover various modifications and equivalent arrangements included within the spirit and scope of the appended claims, which scope is to be accorded the broadest interpretation so as to encompass all such modifications and equivalent structures.

What is claimed is:

1. An apparatus for controlling a rotational speed of a recording disc in reproducing an information signal pre-recorded on said disc as a train of pulses, said information signal being a digital signal including a synchronizing signal and pre-recorded while said disc is rotating with a constant linear velocity, comprising:
- a motor for rotating said recording disc;
- means for reproducing said information signal pre-recorded on said disc;
- means for extracting said synchronizing signal from said information signal reproduced by said reproducing means;
- phase comparing means for comparing the phases between said synchronizing signal and a reference signal and generating a phase difference signal in response to the difference of phases between said synchronizing signal and said reference signal, said reference signal having a predetermined phase relationship to said synchronizing signal while said disc is rotated with a constant linear velocity;
- detecting means for detecting the leading and trailing edges of the pulses of said information signal reproduced by said reproducing means and generating a pulse train signal having pulses of constant amplitude and width;
- smoothing circuit means for smoothing said pulse train signal from said detecting means to produce a dc signal; and
- means for adding the signals from said smoothing circuit means and from said phase comparing means; and
- motor driving means for controlling the rotation speed of said motor in response to the signal from said adding means.

2. An apparatus according to claim 1, wherein said reproducing means comprises:
- a signal detector for detecting the digital information pre-recorded on said disc; and
- a comparator, connected to said signal detector, for comparing the output voltage level of said signal detector with a predetermined voltage level to shape the waveform of the signal from said signal detector.

3. An apparatus according to claim 1, wherein said smoothing circuit means is a low-pass filter.

4. An apparatus according to claim 1, wherein said phase comparing means comprises:
- a phase comparator for comparing the phases between said synchronizing signal and said reference signal; and
- a low-pass filter, connected to said phase comparator, for filtering the signal from said phase comparator to generate the phase difference signal in response to the difference of phases between said synchronizing signal and said reference siqnal.

5. An apparatus according to claim 4, wherein said phase comparator is an exclusive OR circuit.

6. An apparatus according to claim 1, wherein said detection means comprises:
- a first differentiating circuit for differentiating an input signal;
- a second differentiating circuit for differentiating an inverted signal of said input signal;
- a logic circuit, connected to said first and second differentiating circuits, for each passing one polarity of signal in the output signals from said first and second differentiating circuits, and
- a monostable multivibrator, connected to said logic circuit, for generating said pulse train signal in response to the output signal of said logic circuit.

7. An apparatus according to claim 1, further comprising;
- a switching means for interrupting in an given position the connection between said motor driving means and said phase comparing means; and
- a control circuit for causing said switching means to switch selectively.

8. An apparatus according to claim 7, wherein said switching means is provided between said phase comparing means and said adding means.

9. An apparatus according to claim 7, wherein said switching means connects said smoothing means to said motor driving means in a first position and connects said adding means to said motor driving means in a second position.

10. An apparatus according to claim 1, further comprising:
- a phase locked loop circuit, connected to said detecting means, for generating a signal synchronized with the output signal of said detecting means; and
- a demodulation circuit, connected to said phase locked loop circuit, for demodulating the information signal from said detecting means in synchronizing with the signal from said phase locked loop circuit.

11. An apparatus according to claim 10, further comprising a data processing circuit, connected to said demodulation circuit, for restoring said demodulated digital information signal to an analogue information signal.

12. An apparatus according to claim 11, wherein said data processing circuit comprises:
- means for correcting or interpolating errors in said demodulated information signal;
- a memory circuit for storing the signal from said error correcting or interpolating means and the reading it out therefrom; and
- a digital-to-analogue converter for converting the read-out digital signal from said memory circuit into the analogue information signal.

13. An apparatus according to claims 1 or 12, further comprising:
- a master clock generator;
- a first counter for counting down an output signal generated by said master clock generator and supplying its output signal as said reference signal to said phase comparing means; and
- a second counter for counting down said output signal generated by said master clock generator and supplying its output signal as a read-out control signal to said memory circuit.

* * * * *